United States Patent [19]
Okada

[11] Patent Number: 5,250,883
[45] Date of Patent: Oct. 5, 1993

[54] MOTOR DRIVE CONTROL APPARATUS
[75] Inventor: Tadashi Okada, Shiga, Japan
[73] Assignee: Nippon Densan Corporation, Kyoto, Japan
[21] Appl. No.: 837,329
[22] Filed: Feb. 18, 1992
[30] Foreign Application Priority Data Feb. 21, 1991 [JP] Japan ................................. 3-27498
Feb. 21, 1991 [JP] Japan ................................. 3-27499

[51] Int. Cl.⁵ .......................... H02P 3/10; H02P 7/285
[52] U.S. Cl. .................................... 318/494; 318/254; 318/269; 318/374
[58] Field of Search .................. 318/362–382, 318/494, 268–279, 254

[56] References Cited
U.S. PATENT DOCUMENTS

| | | | |
|---|---|---|---|
| 4,549,120 | 10/1985 | Banno et al. | 318/254 |
| 4,587,468 | 5/1986 | Hotta | 318/362 |
| 4,629,949 | 12/1986 | Senso | 318/257 |
| 4,833,378 | 5/1989 | Furue et al. | 318/374 |
| 4,926,101 | 5/1990 | Enomoto et al. | 318/374 |
| 4,929,875 | 5/1990 | Olsson | 318/362 |

Primary Examiner—Bentsu Ro
Attorney, Agent, or Firm—McCormick, Paulding & Huber

[57] ABSTRACT

There is provided a drive control apparatus for a motor having a drive device for controlling current supplied to an armature coil, a control device for controlling the rotation speed of a rotor, and a mode switch device for comparing a rotation speed signal and a predetermined reference voltage and generating a normal rotation mode signal or a reverse rotation mode signal. Furthermore, the drive control device has the drive device, the control device and a signal delay device. The signal delay device delays the supply of a stop signal from the control device by a predetermined time, and a reverse current is supplied to the armature coil during the delay time.

5 Claims, 7 Drawing Sheets

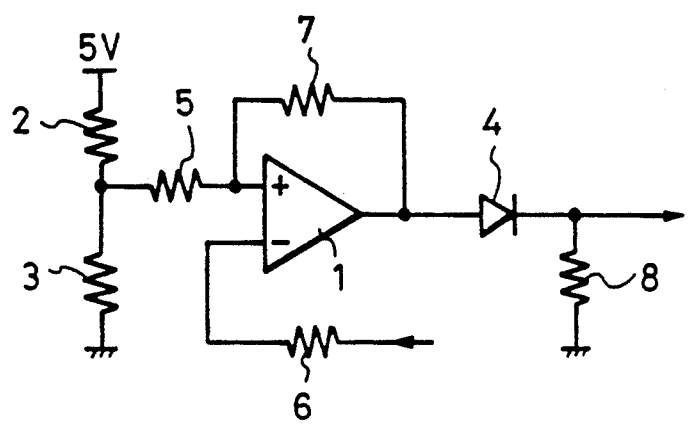
F I G. 1

MOTOR DRIVE CONTROL APPARATUS

BACKGROUND OF THE INVENTION

1. Field of the Invention

The present invention relates to a drive control apparatus for a motor, and more particularly, to a drive control apparatus capable of switching the rotation of a motor from high-speed rotation to low-speed rotation or stop of the rotation in a short time.

2. Description of the Related Art

A well-known type of a spindle motor for driving a magnetic disk employs the Frequency Generator (FG) servo method and the Phase Locked Loop (PLL) servo method together. The FG servo method detects the rotation speed of a motor as frequency by an FG, converts the frequency to a DC voltage, compares the converted voltage with a reference voltage, and controls a voltage applied to an armature coil in accordance with a differential output obtained by the comparison. On the other hand, the PLL servo method detects the rotation speed of a motor by an FG, compares a phase of a rotation frequency signal whose waveform is shaped and a phase of a reference frequency of a reference oscillator, and controls the rotation speed of the motor to be constant by making both the phases agree with each other. The combination of the FG servo method and the PLL servo method makes it possible to prevent incorrect synchronization and to obtain high stability of the rotation precision.

In general, in order to control the speed of the motor, two kinds of state times, that is, acceleration and free run, are controlled by a control means so as to increase or decrease the speed. For example, even in the case of constant-speed control, natural deceleration, that is, deceleration by the control of the time of free run is carried out.

In the above speed control, however, the increase of speed is sufficiently possible, while there is a problem in deceleration since no decelerating force sufficiently acts. In other words, it is necessary to set the state time of free run long in deceleration, and therefore prompt speed change cannot be performed because of the time limit.

Furthermore, in such a kind of motor speed control, the motor is stopped by generating counter torque after rated rotation and decelerating the motor in a short time by the action of braking force arising from the counter torque.

However, depending upon a driving IC (semiconductor circuit) to be used, the motor can be stopped in a short time only after rated rotation, while counter torque does not act in response to a stop command before the rated rotation and the motor cannot be stopped in a short time.

SUMMARY OF THE INVENTION

A first object of the present invention is to provide a drive control apparatus for a motor capable of shortening the switch time from high-speed rotation to low-speed rotation of the motor.

A second object of the present invention is to provide a drive control apparatus for a motor capable of achieving low speed control before rated rotation, and particularly shortening the switch time from high-speed rotation to stop of the motor.

Other objects and features of the present invention will be readily understood from the following description.

BRIEF DESCRIPTION OF THE DRAWINGS

FIG. 1 is a schematic circuit diagram showing the principal part of a drive control apparatus for a motor according to a first embodiment of the present invention;

DETAILED DESCRIPTION OF PREFERRED EMBODIMENTS

The present invention will now be described in detail with reference to the accompanying drawings.

First Embodiment

First, a motor drive control apparatus according to a first embodiment of the present invention will be specifically described with reference to FIGS. 1 to 3.

Figure 2:
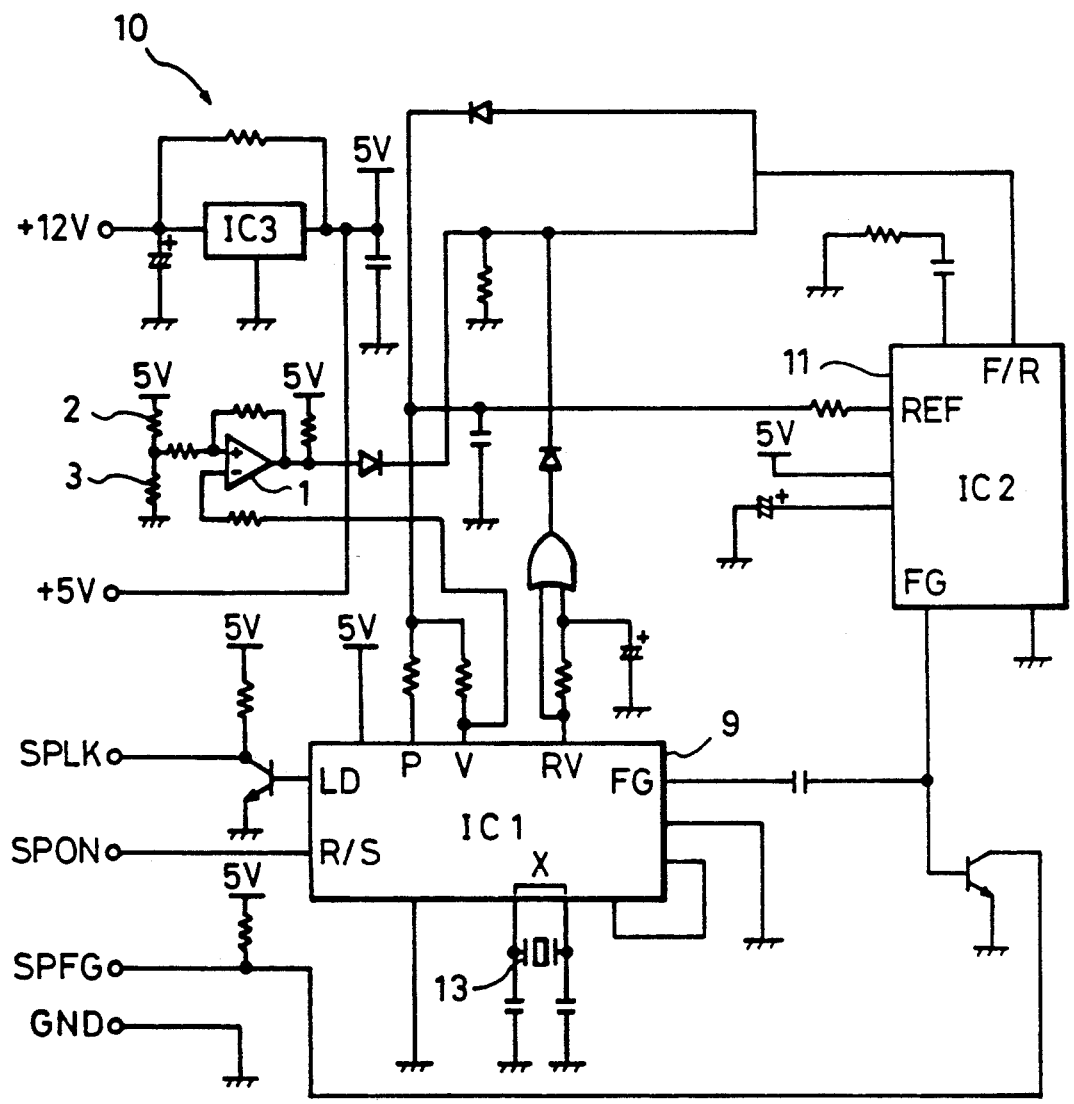
FIG. 2 is a schematic circuit diagram of a control means of the drive control apparatus shown in FIG. 1.
Figure 3:
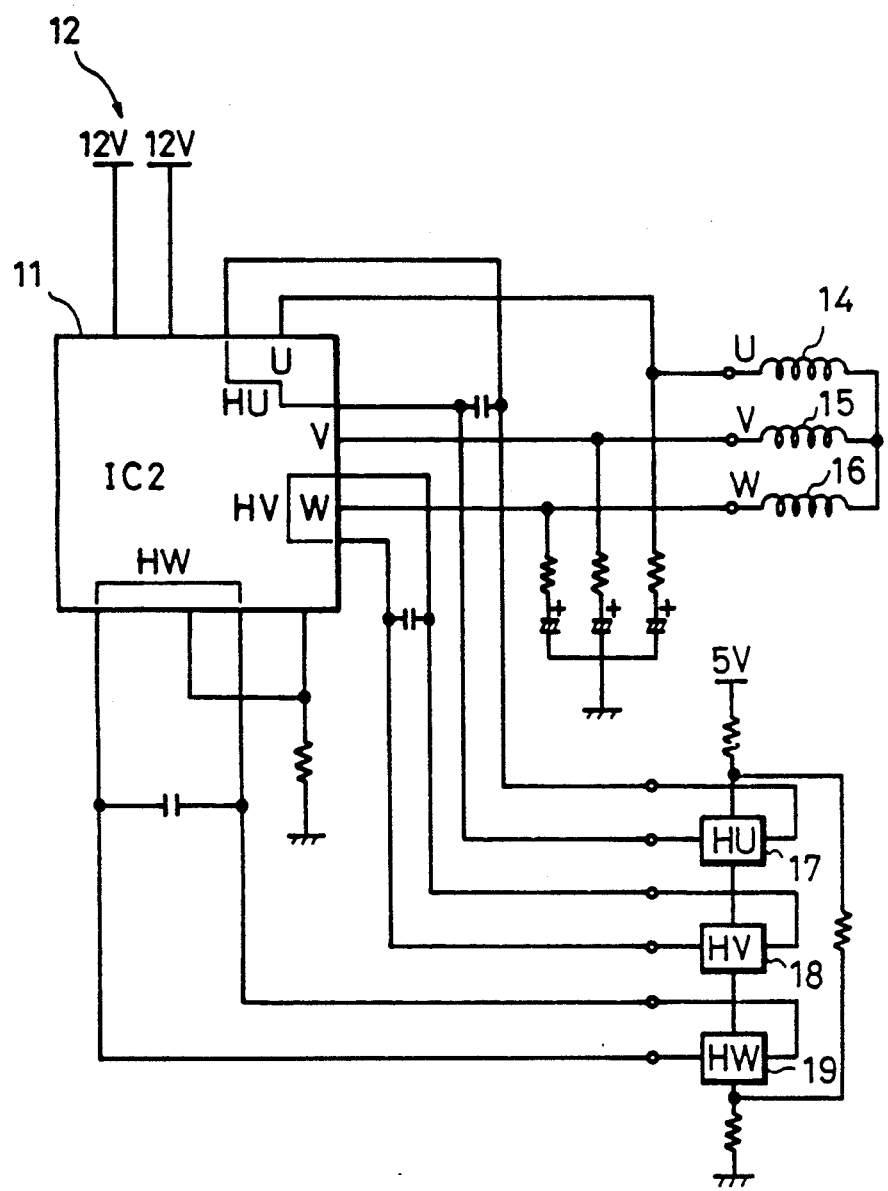
FIG. 3 is a schematic circuit diagram of a drive means of the drive control apparatus shown in FIG. 1.

The illustrated drive control apparatus is provided with a mode switch means shown in FIG. 1 which is disposed between a control means 10 shown in FIG. 2 and a drive means 12 shown in FIG. 3., and can be used as a drive control means for a spindle motor to rotate, for example, a magnetic disk.

Referring to FIG. 1, the mode switch means has a comparing means 1, a rectifier diode 4 and a feedback resistor 7. The comparing means 1 compares an output voltage of a rotation speed signal output from the control means 10 with a predetermined reference voltage. In this embodiment, a negative input terminal of the comparing means 1 is connected to a rotation speed control output terminal of the control means 10 through an input resistor 6. On the other hand, a positive input terminal of the comparing means 1 is connected to a reference voltage source through an input resistor 5. The reference voltage source has a pair of reference voltage resistors 2 and 3 which are connected to each other in series, and a voltage led from a junction of the reference voltage resistors 2 and 3 is used as a reference voltage. The feedback resistor 7 is disposed between an output terminal and the positive input terminal of the comparing means 1. The output terminal of the comparing means 1 is connected to the drive means 12 through the rectifier diode 4.

The comparing means 1 compares the output voltage of the rotation speed signal output from the control means 10 and a predetermined reference voltage led from the reference voltage resistors 2 and 3, outputs a normal rotation mode signal to the drive means 12 when the output voltage of the rotation speed signal is higher than the reference voltage, and outputs a reverse rotation mode signal when the output voltage is less than the reference voltage. The voltages of the signals supplied from the comparing means 1 to the drive means 12 are regulated by a voltage regulating resistor 8.

The reference voltage resistors 2 and 3 are connected to each other in series between a constant voltage (5 V) and the ground. The predetermined reference voltage, that is, a predetermined threshold level voltage is set in accordance with rotational accuracy at the junction of the reference voltage resistors 2 and 3.

The rectifier diode 4 is located in the forward direction from the output terminal of the comparing means 1, and its cathode side is connected to a normal/reverse rotation switch terminal of the drive means 12. An anode side of the rectifier diode 4 is grounded through the voltage regulating resistor 8.

The comparing means 1 having the above construction is a component of the drive control apparatus shown in, for example, FIGS. 2 and 3.

The drive control apparatus is comprised of the control means 10 (shown in FIG. 2) including a semiconductor integrated circuit (IC1) 9 and the drive means 12 (shown in FIG. 3) including a semiconductor integrated circuit (IC2) 11. The semiconductor integrated circuit (IC1) 9 controls the excitation states of armature coils in accordance with the rotational frequency and phase proportional to the rotation speed of a rotor of the motor, and the semiconductor integrated circuit (IC2) 11 controls voltages applied to three-phase motor coils in accordance with the voltage proportional to the rotation speed of the rotor. The drive control apparatus prevents incorrect synchronization by comparing the frequencies in the control means 10 in cooperation with the drive means 12.

In the semiconductor integrated circuit 9 of the control means 10, a pulse input terminal (FG) is connected to an FG of the semiconductor integrated circuit 11 as shown in FIG. 2, and an oscillator 13 for outputting a reference frequency is connected to a crystal oscillation terminal X. A rotation speed signal in accordance with the rotation frequency and phase of the FG is output from a speed control terminal V, and input to the normal/reverse rotation switch terminal F/R of the drive means 12 through the above comparing means 1 as a rotation mode signal for switching between the normal and reverse rotations of the motor, thereby determining the rotation direction of the motor.

In the semiconductor integrated circuit 11 of the drive means 12, output terminals (U, V and W) in various phases are, as shown in FIG. 3, connected to three-phase half-wave driven armature coils (U, V and W) 14, 15 and 16, Hall input terminals (HU, HV and HW) are connected to Hall elements (HU, HV and HW) 17, 18 and 19 corresponding to the armature coils 14, 15 and 16, and the pulse input terminal (FG) is connected to the FG of the semiconductor integrated circuit 9. The armature coils 14, 15 and 16 are electrically conducted in response to respective output signals from the Hall elements 17, 18 and 19, the applied voltages are controlled in accordance with the voltage output of the FG proportional to the rotation speed, and the rotation speed of the motor is determined.

In the above drive control apparatus, for example, if the rotation of the rotor is switched to high-speed rotation, the output voltage of the rotation speed signal from the control means 10 is increased, and magnetic fields in accordance with the applied voltages are generated in the armature coils 14, 15 and 16, thereby accelerating the rotor. On the other hand, deceleration is performed by decreasing the output voltage of the rotation speed signal and putting the rotor into the free run state.

In this case, when the output voltage of the rotation speed signal is more than the predetermined reference voltage led from the reference voltage resistors 2 and 3, the output of the comparing means 1 becomes "LO", that is, a normal rotation mode signal is generated. Therefore, the drive means 12 controls the rotation of the motor in the normal rotation mode without any influence of the output of the comparing means 1. In other words, the rotor is put into the free run state for deceleration, and braked by the free run.

On the other hand, when the output voltage of the rotation speed signal output from the control means 10 is less than the predetermined reference voltage, the output of the comparing means 1 becomes "HI", that is, a reverse rotation mode signal is generated, thereby switching the drive means 12 to the reverse rotation mode. Therefore, the drive means 12 is accelerated in the reverse rotation mode, and the rotation of the motor is switched from high-speed to low-speed in a short time. Thus, the speed switch time can be shortened by switching the rotation of the motor to the reverse rotation mode and accelerating the motor without long free run when the output voltage is less than the predetermined reference voltage.

According to the drive control apparatus of the first embodiment, the comparing means 1 for comparing the output voltage of the rotation speed signal output from the control means 10 and a predetermined reference voltage is located between the control means 10 and the drive means 12. When the output voltage of the rotation speed signal is more than the reference voltage, the drive means 12 is put into the normal rotation mode and the free run control is carried out. When the output voltage is less than the reference voltage, the drive means 12 is switched to the reverse rotation mode so as to perform the reverse rotation control. Therefore, it is possible to quickly switch from high-speed rotation to low-speed rotation in a short time.

Although the mode switch means is composed of circuits, such as the comparing means 1 in the first embodiment, the present invention is not limited to the embodiment. For example, the mode switch means can be composed of a logic gate formed by the combination of a NOT gate and a diode connected in series between the control means 10 and the drive means 12.

Second Embodiment

A second embodiment of a motor drive control apparatus according to the present invention will now be specifically described with reference to FIGS. 4 to 6.

Figure 4:
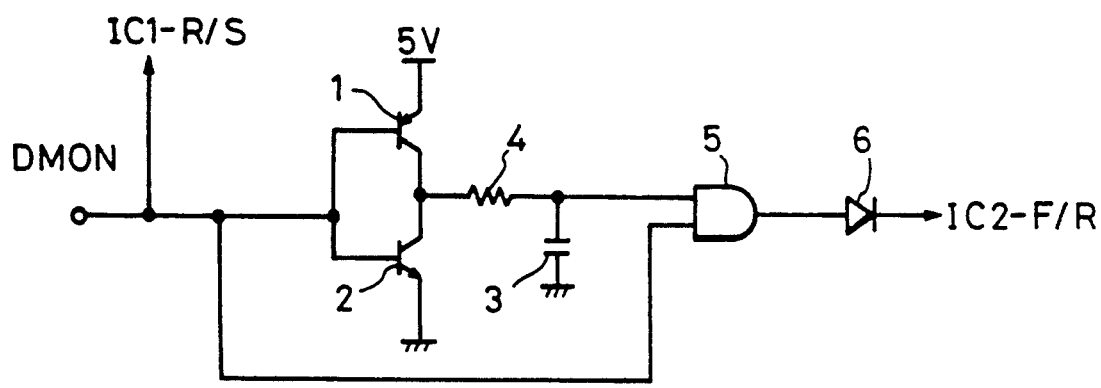
FIG. 4 is a schematic circuit diagram showing the principal part of a drive control apparatus for a motor according to a second embodiment of the present invention.
Figure 5:
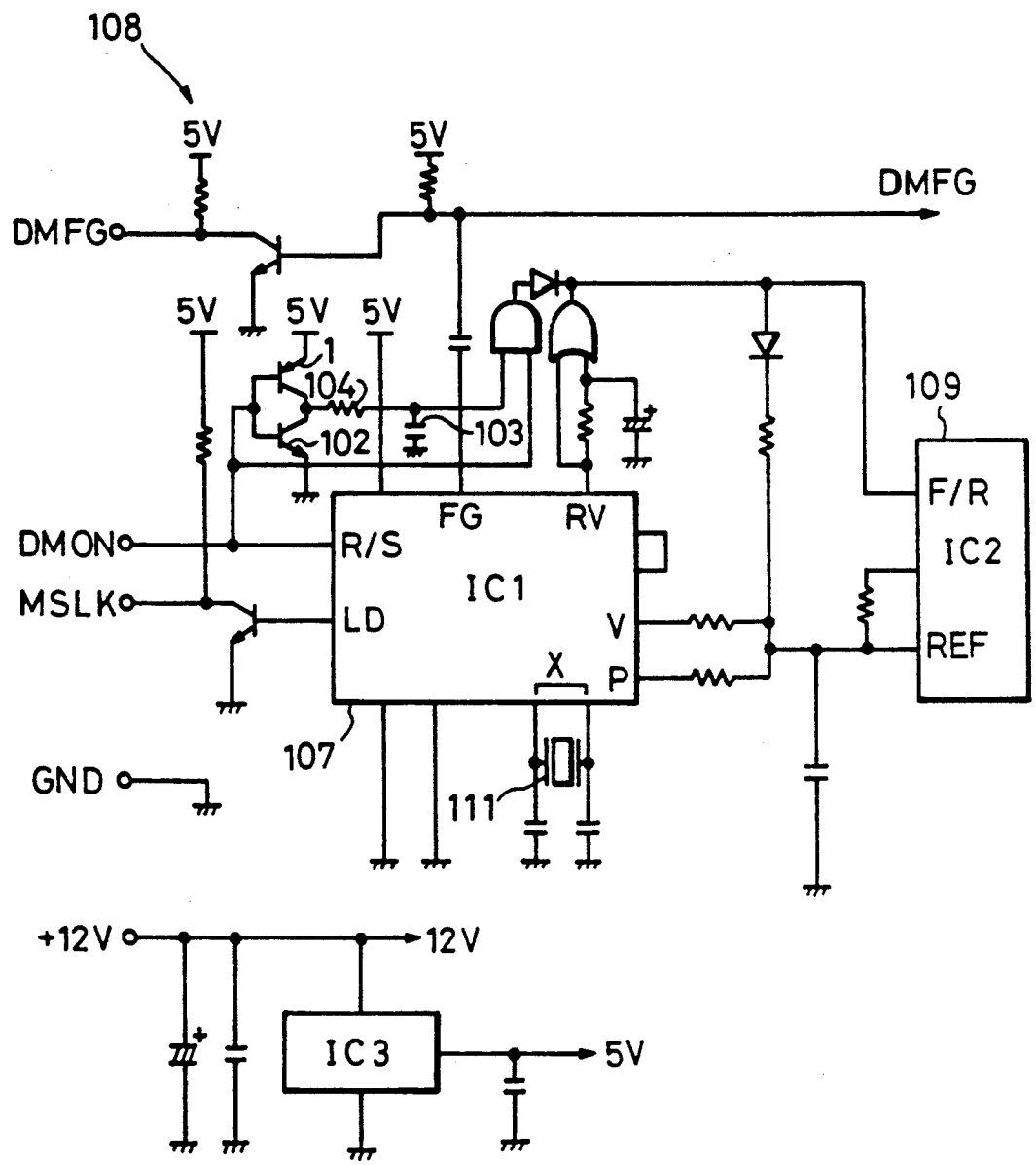
FIG. 5 is a schematic circuit diagram of a control means of the drive control apparatus shown in FIG. 4.
Figure 6:
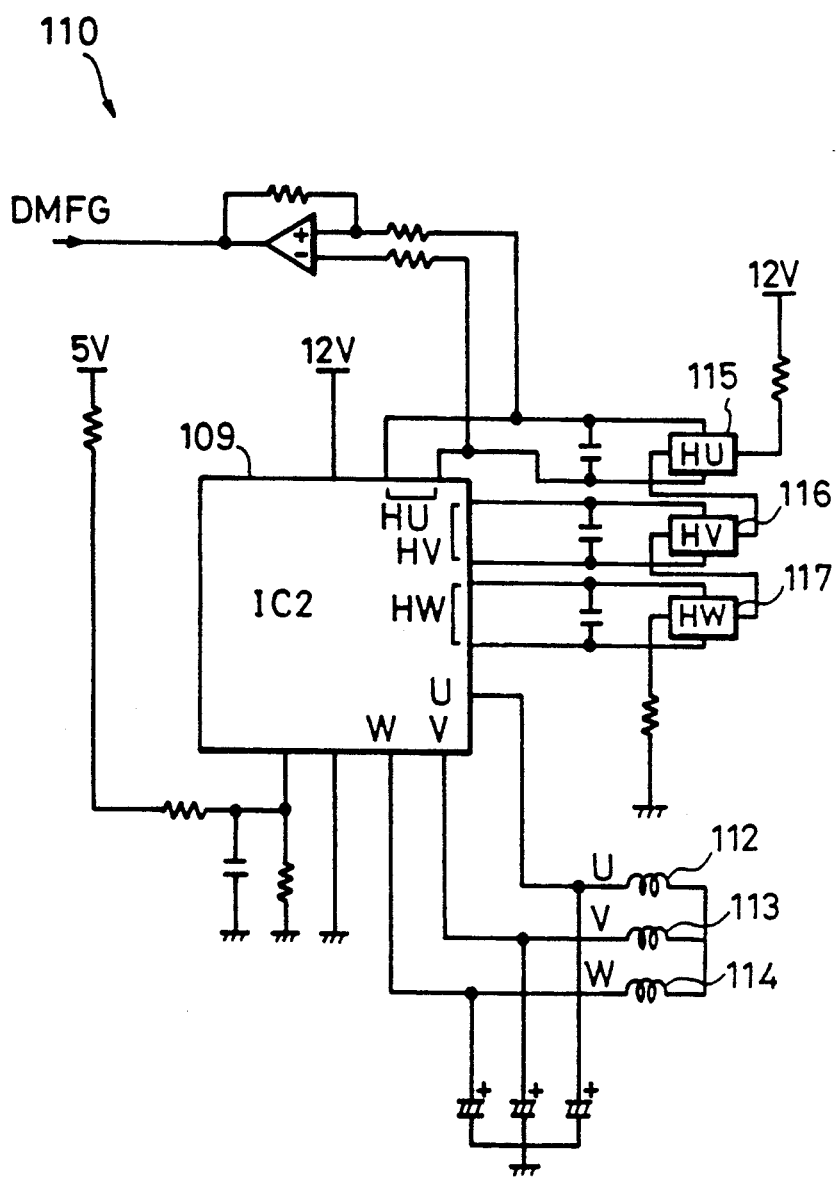
FIG. 6 is a schematic circuit diagram of a drive means of the drive control apparatus shown in FIG. 4.

The drive control apparatus has a signal delay means shown in FIG. 4 which is disposed between a control means 108 shown in FIG. 5 and a drive means 110 shown in FIG. 6.

Referring to FIG. 4, the signal delay means is comprised of a PNP transistor 101 and an NPN transistor 102 for switching between a charge route and a discharge route, a condenser 103 for charging when the charge route is selected, a resistor 104 for discharging the condenser 103 when the discharge route is selected, an AND gate 105 and a diode 106. A stop signal input to the control means 108 is delayed by the signal delay means.

Collector terminals of the PNP transistor 101 and the NPN transistor 102 are connected to each other. A constant voltage (5 V) is applied to an emitter terminal of the PNP transistor 101, and an emitter terminal of the NPN transistor 102 is grounded. Base terminals of the PNP and NPN transistors 101 and 102 are connected to each other, and a stop signal is input between the base terminals.

The PNP transistor 101 is turned on when a signal from the control means 108 is "LO", and the NPN transistor 102 is turned on when the signal is "HI", that is, when a stop signal is supplied from the control means 108, so that the charge and discharge current routes are switched as describe below.

One end of the condenser 103 is connected between the collector terminals of the PNP and NPN transistors 101 and 102 through the resistor 104, and to an input terminal of the AND gate 105 in parallel, and the other end thereof is grounded. The condenser 103 is charged when the charge route is selected and discharged when the discharge route is selected.

The resistor 104 is connected between the collector terminals of the PNP and NPN transistors 101 and 102, and between the condenser 103 and the AND gate 105. The condenser 103 is charged with current through the resistor 104 in charging, and the condenser 103 is discharged through the resistor 104 in discharging.

The signal delay means having the above construction is a component of a drive control apparatus shown in, for example, FIGS. 5 and 6.

The drive control apparatus according to the second embodiment is comprised of the control means 108 including a semiconductor integrated circuit (IC1) 107 for controlling the excitation states of armature coils in accordance with the rotation frequency and phase proportional to the rotation speed of a rotor of the motor, the drive means 110 including a semiconductor integrated circuit (IC2) 109 for controlling the applied voltages to three-phase armature coils in accordance with the voltage proportional to the rotation speed of the motor, and so on, and can prevent incorrect synchronization by comparing the frequencies in the control means 108 in cooperation with the drive means 110.

In the semiconductor integrated circuit 107 of the control means 108, a pulse input terminal FG is connected to another FG as shown in FIG. 5, and an oscillator 111 for outputting a reference frequency is connected to a crystal oscillation terminal X. A stop signal (DMON) input to a drive/stop switch terminal R/S is delayed by a predetermined time by the above signal delay means, and a motor reverse rotation signal is output from a reverse rotation signal output terminal RV to the drive means 110 during the delay time.

In the semiconductor integrated circuit 109 of the drive means 110, as shown in FIG. 6, output terminals (U, V and W) in various phases are connected to three-phase half-wave driven armature coils (U, V and W) 112, 113 and 114, and Hall input terminals (HU, HV and HW) are connected to Hall elements (HU, HV and HW) 115, 116 and 117 corresponding to the armature coils 112, 113 and 114. The FG is also connected to the semiconductor integrated circuit 109. The armature coils 112, 113 and 114 are electrically conducted in response to respective output signals from the Hall elements 115, 116 and 117, and the applied voltages are controlled in accordance with the voltage output of the FG proportional to the rotation speed, thereby determining the rotation speed of the motor.

In the drive control apparatus of the second embodiment, for example, when a signal input to the control means 108 is "LO", a motor drive command is input, and the rotor is rotated. At this time, the PNP transistor 101 is turned on, the current flows from 5 V to the condenser 103 through the PNP transistor 101 and the resistor 104, and the condenser 103 is charged.

On the other hand, when a signal input to the control means 108 is "HI", that is, when a stop signal is input, the NPN transistor 102 is turned on, the charges accumulated in the condenser 103 flow to the ground through the resistor 104 and the NPN transistor 102, and discharging is performed.

The supply of the stop signal to the drive means 110 is continued for a predetermined time, that is, a time necessary for the discharge of the condenser 103, and a motor reverse rotation signal is output to the drive means 110 from the time when the stop signal is input to the time when a predetermined delay time passes (reverse current is supplied to the armature coils 112, 113 and 114).

According to the drive control apparatus of the second embodiment, since the signal delay means for delaying a stop signal by a predetermined time is mounted between the control means 108 and the drive means 110, a counter torque can be generated even if a stop command is given before rated rotation, which cannot be achieved by the circuitry of the prior art. Therefore, it is possible to shorten the switch time from high-speed rotation to low-speed rotation or stop of rotation before rated rotation.

In this embodiment, as readily understood from FIGS. 5 and 6, a stop signal from the control means 108 is supplied to the drive means 110 through the signal delay means, and directly to the drive means 110. The drive means 110 supplies reverse current to the armature coils 112, 113 and 114 during the delay time of the signal delay means or the time when the stop signal is directly supplied from the control means 108 to the drive means 110, which is longer, thereby braking the rotor while the reverse current is supplied. Before the rated rotation, the stop signal is not directly supplied from the control means 108 to the drive means 110, but supplied through the signal delay means.

Figure 7:
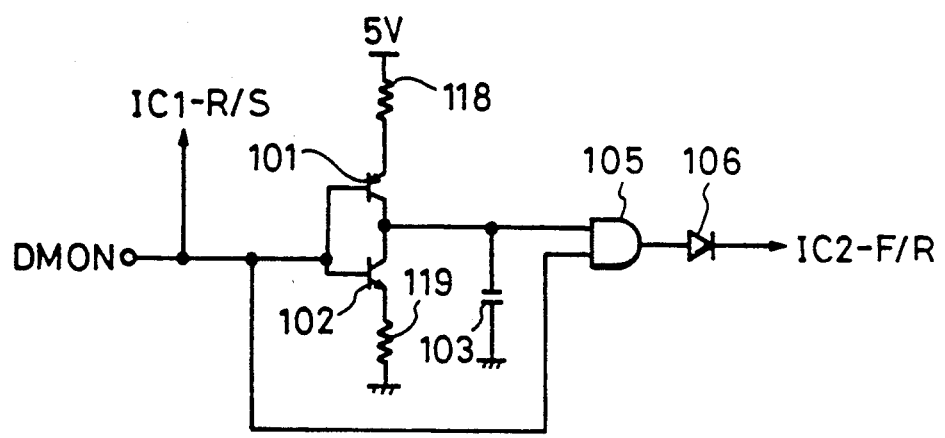
FIG. 7 is a schematic circuit diagram showing a variation of a signal delay means.

The circuitry of the signal delay means is not limited to one shown in FIG. 4. For example, as shown in FIG. 7, a resistor 118 may be connected between 5 V and the emitter terminal of the PNP transistor 101, and a resistor 109 may be connected between the emitter terminal of the NPN transistor 102 and the ground.

In this case, since the times of charge and discharge can be controlled, if is possible to generate a more precise counter torque and thus to enhance the stopping accuracy.

Although the embodiments of the drive control apparatus according to the present invention are described above, the present invention is not limited to the embodiments, and various variations and changes may be made without departing from the scope of the present invention.

Although the present invention is applied to a motor used in a magnetic disk drive apparatus in the above description, it is not limited to the motor, and applicable to other motors in, for example, a laser printer and an optical disk drive apparatus.

What is claimed is:

1. A drive control apparatus for a motor, comprising:
   drive means for controlling current supplied to an armature coil;

control means for controlling the rotation speed of a rotor based on a rotation speed signal proportional to the rotation speed of said rotor; and mode switch means disposed between said drive means and said control means;

wherein said mode switch means has comparing means for comparing a rotation speed signal output from said control means and a predetermined reference voltage, wherein said comparing means generates a normal rotation mode signal when an output voltage of the rotation speed signal is more than the predetermined reference voltage, and generates a reverse rotation mode signal when the output voltage of the rotation speed signal is less than in the predetermined reference voltage, braking being performed by free run of said rotor when said comparing means generates the normal rotation mode signal, and by supplying a reverse current to said armature coil when comparing means generates the reverse mode signal.

2. A drive control apparatus according to claim 1, wherein said control means is connected to a negative input terminal of said comparing means, the predetermined reference voltage is supplied to a positive input terminal of said comparing means, and a feedback resistor is connected between an output terminal and said positive input terminal of said comparing means.

3. A drive control apparatus according to claim 2, wherein a rectifier diode is disposed between said output terminal of said comparing means and said drive means.

4. A drive control apparatus for a motor, comprising:
drive means for controlling current supplied to an armature coil;
control means for controlling the rotation speed of a rotor based on a rotation speed signal proportional to the rotation speed of said rotor; and
signal delay means disposed between said drive means and said control means,
wherein, when a stop signal is output from said control means, said signal delay means delays the supply of the stop signal by a predetermined time, and thus a reverse current is supplied to said armature coil during the delay time of the stop signal,
said stop signal from said control means being supplied to said drive means through said signal delay means and directly to said drive means, and the reverse current being supplied to said armature coil during the delay time of said signal delay means or the time when the stop signal is directly supplied from said control means to said drive means, which is longer.

5. A drive control apparatus for a motor, comprising:
drive means for controlling current supplied to an armature coil;
control means for controlling the rotation speed of a rotor based on a rotation speed signal proportional to the rotation speed of said rotor; and
signal delay means disposed between said drive means and said control means,
wherein, when a stop signal is output from said control means, said signal delay means delays the supply of the stop signal by a predetermined time, and thus a reverse current is supplied to said armature coil during the delay time of the stop signal,
said signal delay means including a delay condenser, and the stop signal being delayed during the discharge of said delay condenser, and
said signal delay means including a PNP transistor disposed in a charge route for charging said delay condenser and an NPN transistor disposed in a discharge route for discharging said delay condenser, said delay condenser being charged through said charge route when said PNP transistor is energized, and discharged through said discharge route when said NPN transistor is energized.

* * * * *